(12) United States Patent
Stephenson, Jr.

(10) Patent No.: US 6,543,708 B1
(45) Date of Patent: Apr. 8, 2003

(54) GAS-CONTROLLED SPRAY GUN AND METERING APPARATUS

(75) Inventor: Everett H. Stephenson, Jr., Savannah, GA (US)

(73) Assignee: International Paper Company, Stamford, CT (US)

(*) Notice: Subject to any disclaimer, the term of this patent is extended or adjusted under 35 U.S.C. 154(b) by 66 days.

(21) Appl. No.: 09/781,335

(22) Filed: Feb. 12, 2001

Related U.S. Application Data (60) Provisional application No. 60/181,992, filed on Feb. 11, 2000.

(51) Int. Cl.[7] .................................................. B05B 5/00
(52) U.S. Cl. ........................................ 239/691; 239/708
(58) Field of Search ................................ 239/690, 691, 239/704, 708

(56) References Cited

U.S. PATENT DOCUMENTS

| | | | |
|---|---|---|---|
| 559,386 A | 5/1896 | Jones | |
| 713,931 A | 11/1902 | Ambruster | |
| 1,274,212 A | 7/1918 | Thompson | |
| 2,704,171 A | 3/1955 | Cole | 222/148 |
| 3,169,882 A | 2/1965 | Juvinall et al. | 117/93.4 |
| 3,185,190 A | 5/1965 | Crawford | 141/360 |
| 3,221,948 A | 12/1965 | Kalist | 222/334 |
| 3,493,148 A | 2/1970 | Cosner et al. | 222/194 |
| 3,691,991 A | 9/1972 | Luderer et al. | 118/629 |
| 3,740,612 A | 6/1973 | Gauthier et al. | 317/3 |
| 3,797,709 A | 3/1974 | Ivanovich | 222/194 |
| 4,305,531 A | 12/1981 | Dooley et al. | 222/334 |
| 4,399,945 A | 8/1983 | Ruud | 239/697 |
| 4,438,872 A | 3/1984 | Dooley et al. | 222/217 |
| 5,341,990 A | 8/1994 | Konieczynski | 239/3 |
| 5,344,082 A | 9/1994 | Haller et al. | 239/697 |
| 5,350,084 A | 9/1994 | Miller et al. | 222/137 |
| 5,526,986 A | 6/1996 | Padgett et al. | 239/690 |
| 5,612,096 A | 3/1997 | Mulder et al. | 427/466 |
| 5,615,830 A | 4/1997 | Matsunaga et al. | 239/8 |
| 5,615,832 A | 4/1997 | Price | 239/8 |
| 5,620,138 A | 4/1997 | Crum | 239/3 |
| 5,622,313 A | 4/1997 | Lader et al. | 239/3 |
| 5,707,013 A | 1/1998 | Konieczynski | 239/691 |
| 5,711,489 A | 1/1998 | Yanagida et al. | 239/697 |
| 5,727,931 A | 3/1998 | Lash et al. | 417/392 |
| 5,737,174 A | 4/1998 | Konieczynski | 361/220 |
| 5,752,788 A | 5/1998 | Crum | 406/29 |
| 5,820,941 A | 10/1998 | Felton et al. | 427/476 |
| 5,839,668 A | 11/1998 | Varney et al. | 239/690 |
| 5,850,976 A | 12/1998 | Robidoux | 239/698 |
| 6,003,779 A | 12/1999 | Robidoux | 239/3 |
| 2002/0100823 A1 * | 8/2002 | Robidoux | 239/697 |

OTHER PUBLICATIONS

Nordson Corporation, Amherst, Ohio and Westlake, Ohio: Tribomatic 500 Manual Powder Spray Gun; Customer Product Manual Part 237 467B, Manual 37–31 (1997) pp 1–31.

Nordson Corporation, Amherst, Ohio and Westlake, Ohio: Cup Gun Kit for Tribomatic 500 Manual Powder Spray Gun; Manual 37–31A (1998) pp 1–4.

Safety Disk Powder Measure; Lee Precision, Inc., Hartford, Wisconsin.

\* cited by examiner

*Primary Examiner*—Lisa A. Douglas
(74) *Attorney, Agent, or Firm*—Ostrager Chong & Flaherty LLP (57) ABSTRACT

A spraying apparatus without electrical connections comprising means for controlling air supplies with signals generated with compressed air. The apparatus may further include a metering device which delivers metered amounts of powder to a spray gun and which may be controlled by the same compressed air which controls the air supplies.

34 Claims, 9 Drawing Sheets

GAS-CONTROLLED SPRAY GUN AND METERING APPARATUS

This application claims the benefit of Provisional application No. 60/181,992, filed Feb. 11, 2000.

BACKGROUND OF THE INVENTION

Triboelectric spray guns may be used to spray fine powders in various applications including painting or specialized powder coating applications such as controlled, or supplementary pollination of plants. These sprayers use pressurized gas to expel particles which are electrostatically charged during the expulsion process due to their contact and friction with one or more surfaces within the gun. This "tribo", or "friction" charging distinguishes these spray guns from other types of electrostatic spray guns which use electrodes to impart a charge on the powder particles during the spraying process.

In a typical manual configuration, a triboelectric spray gun with its accompanying components comprises a hand held sprayer which is attached by electrical wiring and tubing to a controller module and a source of material, such as powder, to be sprayed. Usually the gun is equipped with a trigger which activates an electrical switch and the switch, in turn, activates the controller module. The controller module controls the delivery of one or more airs to the gun which draw powder into the gun, accelerate the powder and expel it in an electrically charged state.

Although this arrangement may work well in some circumstances, it is inherently unsafe because the operator of such a system is constantly in contact with an electrical switch and the gun itself is connected to electrical wiring. This may pose a danger to the operator because electrical connections may result in shocks or sparks which can ignite the material being expelled from the sprayer. Further, operators working outside or in greenhouses or shade houses may be exposed to weather or misting or fogging systems, and would benefit from a system which included a spray gun and a controller module which were both isolated from electrical connections.

One alternative to an electrical switching device is a switching device which is controlled by air, such as by an air-solenoid. U.S. Pat. No. 5,615,832 describes an apparatus which uses both electrical and air solenoid type switches to control airs in a triboelectric gun. However, this apparatus includes a relatively complex arrangement of electrical circuits to regulate the airs. Therefore, this apparatus is still burdened with electrical connections and wiring which may lead to electrical shocks or sparks.

Another alternative is found in U.S. Pat. No. 3,740,612. This device includes a trigger which activates two air solenoid/valve type arrangements. However, the apparatus described in this patent is an electrostatic sprayer which necessarily includes high voltage wiring leading to an electrode which charges the powder as it is expelled from the gun. The result is that this device still poses a shock or sparking danger to its operator.

Further alternatives include those found in U.S. Pat. Nos. 5,850,976 and 6,003,779 which disclose sprayers with air valves that control the spraying operation. However, these devices include a system for fluidizing the powder in the reservoir and are not effective for spraying measured amounts of powder.

Thus, there is a need for a triboelectric sprayer which improves upon the art by allowing an operator to manually operate the gun without being exposed to high or low voltage shocks, sparks or the dangers related thereto. Further, there is a need for an inexpensive method for controlling a spray gun apparatus with no electrical connections. In addition, there is a need for a metering device which will operate with a fully air controlled gun and which can also be controlled without electrical connections. And further, there is a need for a device particularly suited for delivering small, measured quantities of electrically charged pollen, which is inexpensive, simple to operate and particularly suitable for outdoor use.

SUMMARY OF THE INVENTION

Accordingly, it is a principal object of the invention to provide a spraying system which improves upon the prior art by eliminating all electrical controls from a triboelectric spray gun and controller module so that they are suitable for outdoor use and other applications, while optionally adding a metering system which allows a measurable and repeatable amount of particles to be expelled from the sprayer.

In accordance with one preferred embodiment of the invention the apparatus comprises a means for controlling airs to a triboelectric spray gun with signals generated with compressed air.

In accordance with another preferred embodiment of the invention the apparatus comprises a metering device which delivers metered amounts of powder to a spray gun and which is controlled with compressed air.

In accordance with another preferred embodiment of the invention the apparatus comprises both the air controlling means and the metering device, the metering device being controlled by the same compressed air which controls the airs.

BRIEF DESCRIPTION OF THE DRAWINGS

FIGS. 1*a–d* are perspective views of components of the preferred spraying apparatus, including (1*a*) a controller, (1*b*) a sprayer with metering device, (1*c*) compressor, regulator and filter, and (1*d*) air filter and dryer;

FIG. 2 is a schematic depicting a preferred arrangement of the spraying system;

FIG. 3 is a cross-sectional view of a spray gun used in the preferred embodiment spraying system;

FIG. 4*a* is a cross-sectional view of a preferred spray gun modified in accordance with the invention;

FIG. 4*b* is a cross-sectional view of a prior art spray gun arrangement;

FIG. 5*a* is a perspective view of a preferred metering apparatus;

FIG. 5*b* is a top cross-sectional view of a preferred metering apparatus;

FIG. 5*c* is a side cross-sectional view of a preferred metering apparatus;

FIGS. 6*a–c* are perspective views of a variety of ported slides which may be used within the metering apparatus;

FIG. 7 is detailed perspective view of a controller which may be used with the preferred spraying system.

DETAILED DESCRIPTION OF THE PREFERRED EMBODIMENTS

As used herein the terms "powder" or "particulate matter" may include powdered paint, pollen, powdered lubricants or any other materials appropriate for use with the invention. The terms "gas" and "air" are used interchangeably to refer to air or any other suitable gas.

A typical triboelectric gun was modified in order to demonstrate and test the invention. The spray gun used was a Nordson Corporation TRIBOMATIC® 500 Manual Powder Spray Gun equipped with a Cup Gun Kit. However, the invention is applicable to a wide range of spraying devices. On the unmodified gun the trigger actuates an electrical microswitch which sends a signal to a controller module. The electrically controlled controller module actuates two separate airs to the gun: (1) a flow air, which creates a low pressure region within the rear portion of the gun and assists the flow of powder into the forward portion of the gun, and (2) a diffuser air, which accelerates the powder and expels it from the gun through an opening at the end of the barrel. Various methods well known within the industry exist for supplying a steady flow of powder to the gun for expulsion. Further, a large variety of spray guns which may be suitable for use with the invention are available and they may have only one, or two or more airs fed to the spray gun.

In one embodiment of the invention a TRIBOMATIC® spray gun was modified to be controlled by air rather than electric controls, and to include a metering device which provides a measured amount of powder to the gun. In another preferred embodiment, the system can be used to deliver specific amounts of pollen to flowering plants.

In the modified apparatus there are no electrical connections between the gun and the controller module, and the controller module may send three air supplies to the gun: (1) the trigger switch air, which may be directed to an optional metering apparatus, (2) the diffuser air, and (3) the flow air.

The trigger on the modified spray gun opens an air valves which controls air solenoids, as opposed to controlling electrical switches on the unmodified gun's controller module. Thus, except for the possible use of one or more ground wires 47 (FIG. 4*a*), commonly run from the barrel to a grounding surface and from the handle to a grounding surface with the TRIBOMATIC® spray gun, which reduce the difference in electrical charge between the gun and the target being sprayed, there is no electrical wiring connected to the gun. This is advantageous because these guns are often operated outdoors from elevated platforms or buckets and a gun without electrical connections is safer and less expensive to construct, maintain and operate.

The trigger switch air may be directed to cause the air-actuated powder metering apparatus to release a repeatable, user selectable, amount of powder into the spray gun. When the metering apparatus is actuated, a miniature, single-acting, spring return air cylinder/piston shifts a ported slide. The port in the slide, which has a predetermined volume, aligns first with the mating port in the powder supply and the powder is fed into the ported slide by gravity. As the slide continues on its path, the port, now full of powder, aligns with an inlet to the gun and the powder is fed to the gun through a combination of gravity and the vacuum created by the flow air. The slide returns to its retracted position, as a vent allows the pressure in the cylinder to return to the ambient air pressure.

Each actuation delivers a specific volume of powder, which is determined by the size of the port in the interchangeable slide. Injection rate and duration is determined by the orientation and shape of the ports and speed of slide movement, all of which can be varied.

Thus, each pull of the trigger actuates three separate airs: the flow and diffuser airs, as in a standard spray gun, and the trigger/metering apparatus air. The metering apparatus air is supplied from the primary air supply to the controller module. Therefore, varying the primary air pressure will affect the operation of the metering apparatus directly. The flow and diffuser air pressures can be adjusted separately to maximize the efficient distribution of the powder and accurately control its electrical charge.

In operation the spray gun works much like a semiautomatic weapon, in that each trigger pull actuates the three airs and causes a quick burst of powder to be expelled from the gun.

Referring to the Figures. FIG. 1(*a*) represents a preferred controller module. FIG. 1(*b*) shows a preferred metering apparatus 2 mounted on a spray gun 4 which may be modified for use in accordance with the invention. FIG. 1(*c*) represents a compressor 6, regulator 8 and a filter 10 suitable for use with the invention. FIG. 1(*d*) represents a filter 12 and dryer 14 suitable for use in the preferred embodiments.

FIG. 2 is a schematic depicting a preferred arrangement of the spraying system. The preferred embodiments will operate with any standard compressed air supplies. As shown in FIG. 2, a truck brake air supply 16 can be fed to the dry tank of the truck air brake system 18 and to the truck protection valve 20 for use as a compressed air supply. Alternatively, an oil free air compressor/tank 22 powered by a 120 volt generator 24 may be used as a compressed air supply.

The air supply was connected to an air conditioning unit 26 which included a filter, air dryer, oil scrubber and air cooler 26 which was connected to a moisture indicator 28 and a pressure regulator 30. The compressed air was then delivered to the controller module where it was filtered by two filters 32, 34. Thereafter the compressed air, at about 40–45 psi in this preferred embodiment, was fed to pressure regulators 36, 38. Two filters were used in order to maintain air pressures while using miniature components, though other arrangements could be used.

The filtered air was fed to the pressure regulators 36, 38 which reduced the pressure to about 10–25 psi before it reached two normally closed poppet valves 40, 42. The filtered air was also connected to the trigger valve 44 through line 70. Once compressed air is fed into the system the trigger valve 44 receives pressurized air from regulator 30 and the poppet valves 40 and 42 receive pressurized air from regulators 36 and 38 respectively.

The system is set into operation when a trigger is depressed by an operator and the trigger valve 44 is opened, allowing compressed air into line 46. The compressed air in line 46 travels to air powered actuators 48, 50 which open poppet valves 40 and 42, respectively, which allow compressed air to enter lines 52 and 54. The compressed air in line 46 also travels to an optional flow controller 56 and on to an optional metering apparatus which is depicted in FIG. 2 as a spring return air cylinder 58 and a powder source 60.

The above chain of events results in three inputs to the spray gun 62. Powder is fed to the spray gun through connector 64, and compressed air is fed to the gun through lines 52 (diffuser air) and 54 (flow air). After the spray gun is "fired" the pressure increase in line 46 dissipates through an exhaust vent 45 in the three-way poppet (trigger) valve 44, poppet valves 40 and 42 close, and the air cylinder 58 returns to a starting position so that the spray gun may be reactivated. Regulator 30 may be adjusted to help synchronize the metering device with the opening of poppet valves 40 and 42. The vent 45 is a drill hole in the stem of the three-way poppet valve 44, which vents the output port when the valve 44 is released.

In the particular spray gun used to demonstrate the invention the connector 64 connects to an opening at the top of the gun which is intended for test samples from a covered cup or funnel. However, guns without this opening may be easily modified to function with the metering apparatus.

Figure 3:
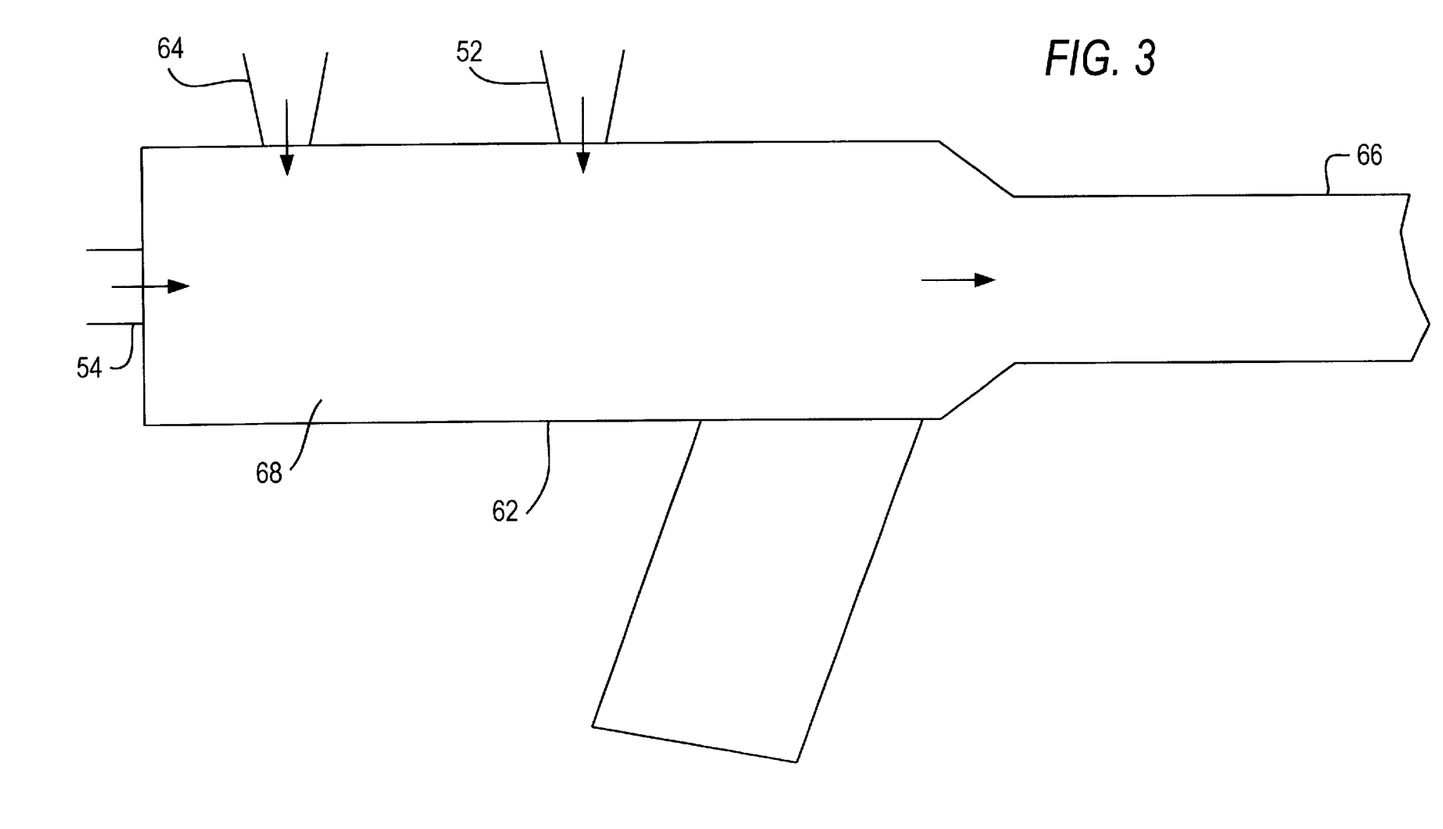

FIG. 3 shows the three inputs to the spray gun 62. Compressed gas enters the gun chamber 68 from diffuser line 52 and flow line 54 and powder (not shown) enters through connector 64. The two streams of compressed gas mix with the powder, accelerate it and project it through the barrel 66 part of the gun chamber where the powder becomes electrically charged and is discharged from the gun. The particular advantage of having the powder enter through the metering device 2 into the gun chamber 68 is that the metering device can be adjusted to deliver a specific volume of powder, as described further below.

Figure 6A:
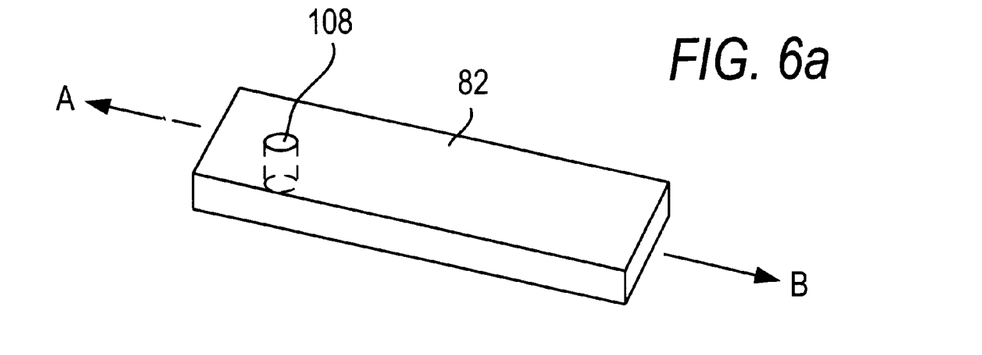
Figure 6B:
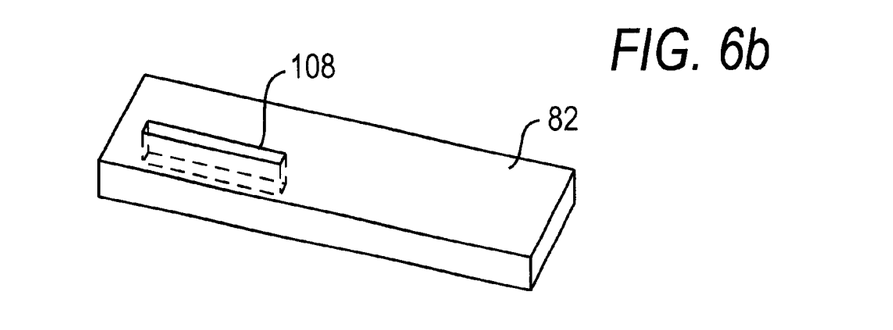
Figure 6C:
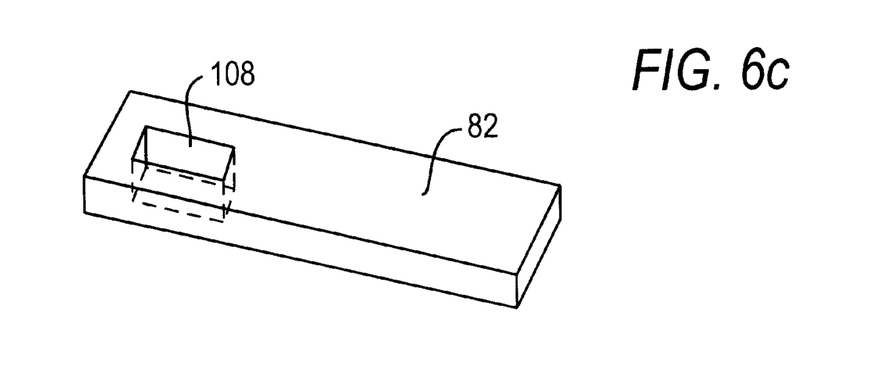

FIGS. 4a and 5a–c show the metering device 76, the spray gun 62 and the modifications thereto in greater detail. FIG. 6a–c show the ported slide which carries the metered amount of powder. FIG. 4b shows a prior art spray gun arrangement. The metering device 76 is not part of the prior art guns. Generally, powder is fed to an inlet in the gun adjacent to the location where line 54 enters the gun. However this is generally a steady stream of entrained powder or a simple gravity feed from a cup 130 (FIG. 4b) which cannot be accurately measured or controlled for brief intervals or pulses. Further, the prior art triboelectric guns do not include the air circuit provided by connector 72 and line 46 to optionally divert compressed air to the metering device 76.

Figure 4A:
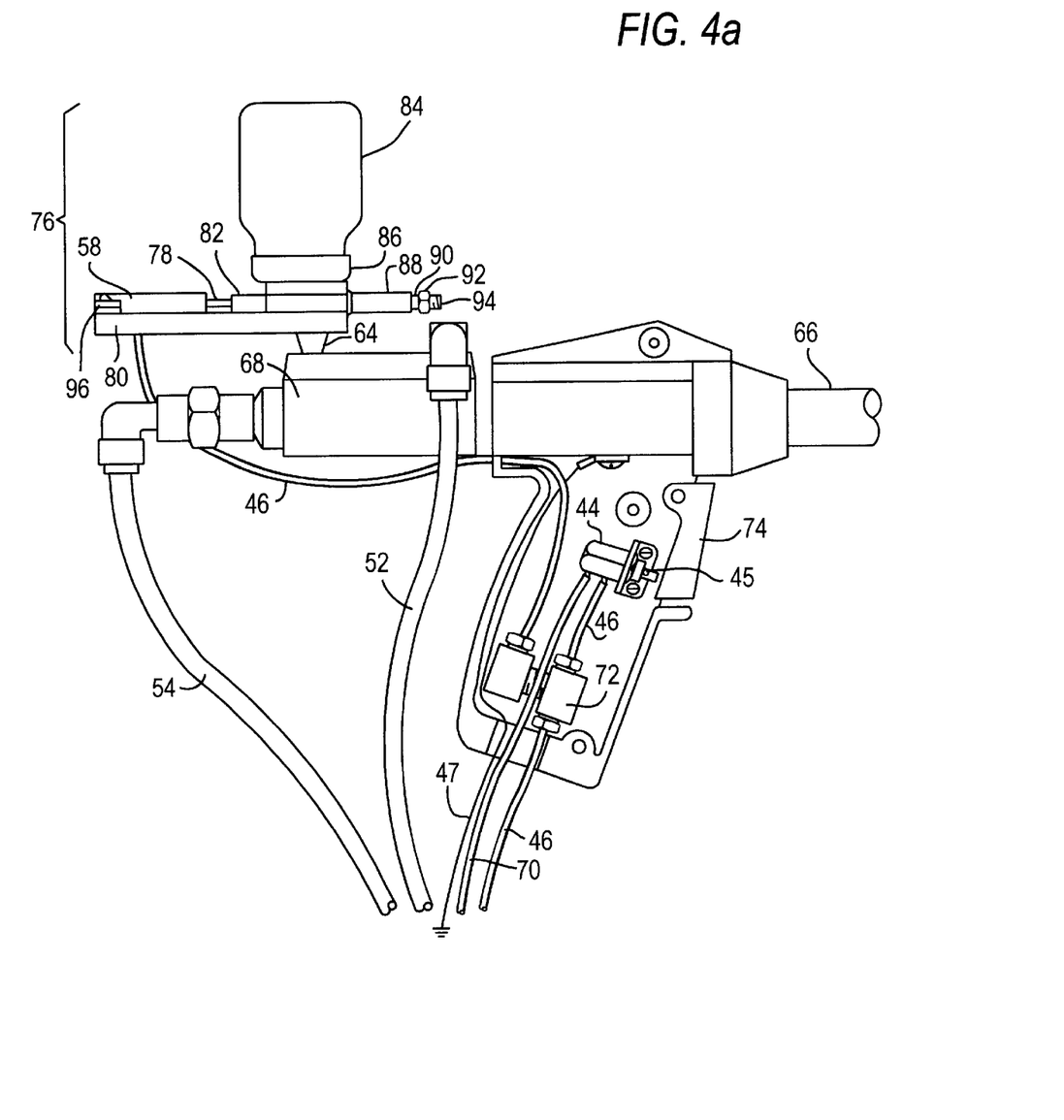
Figure 4B:
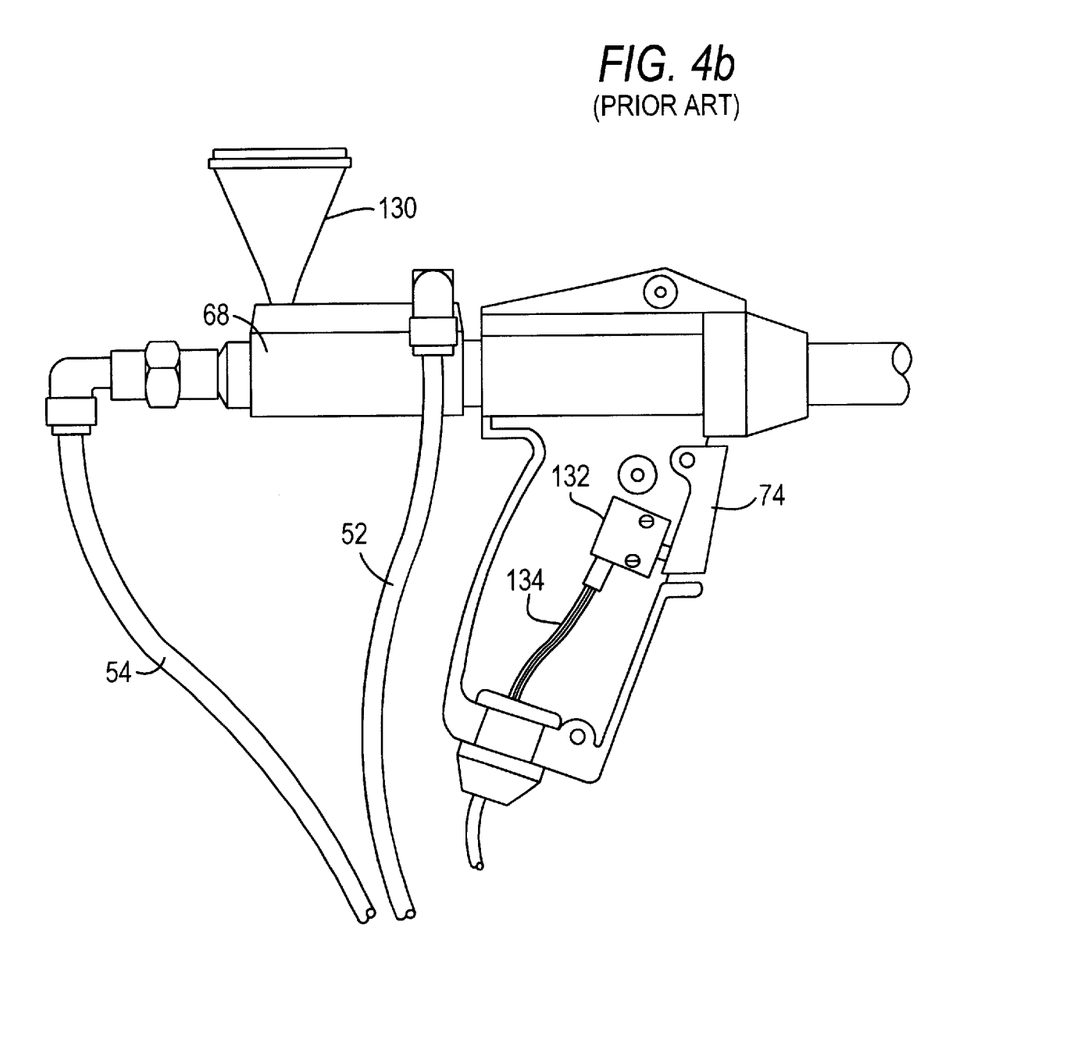
Figure 5A:
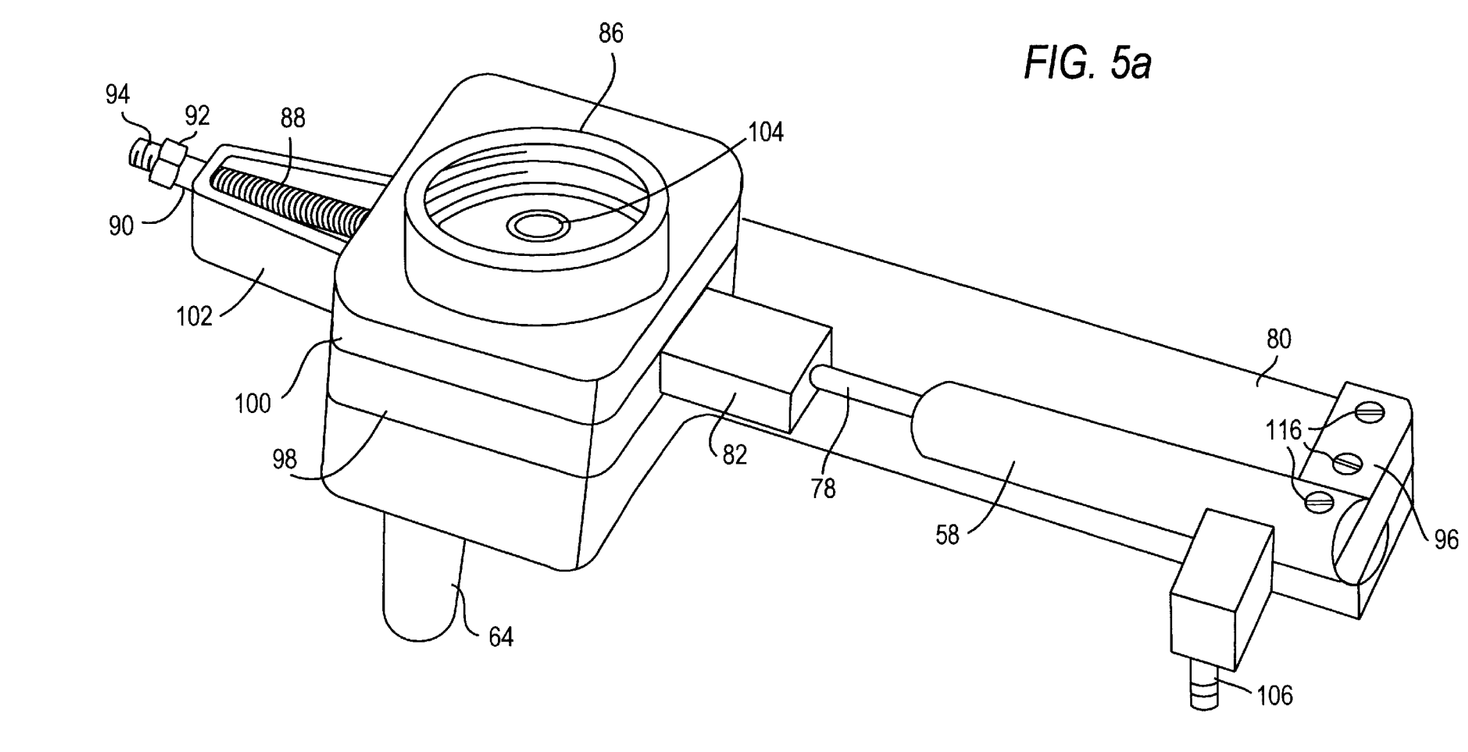
Figure 5B:
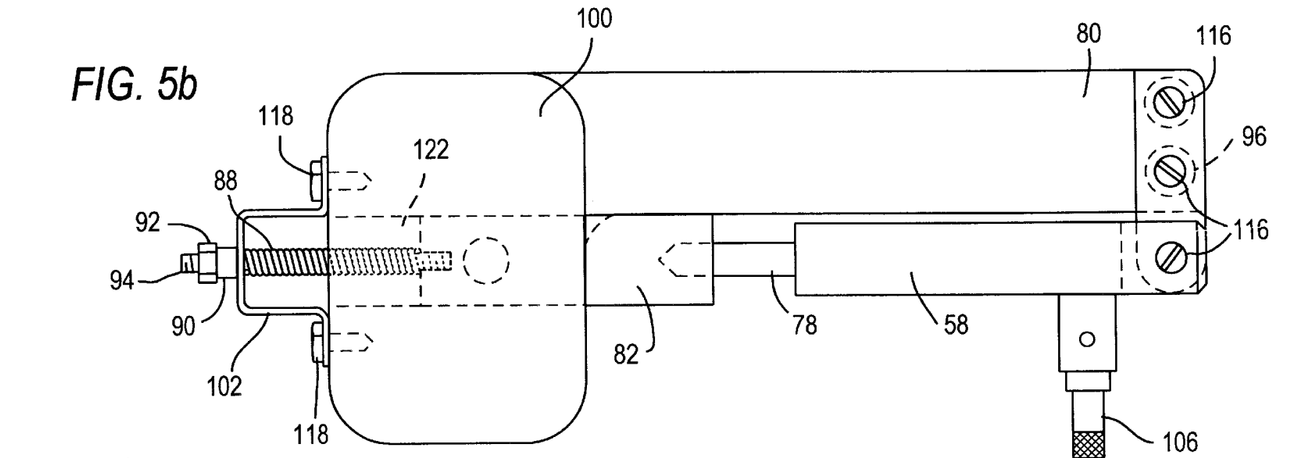
Figure 5C:
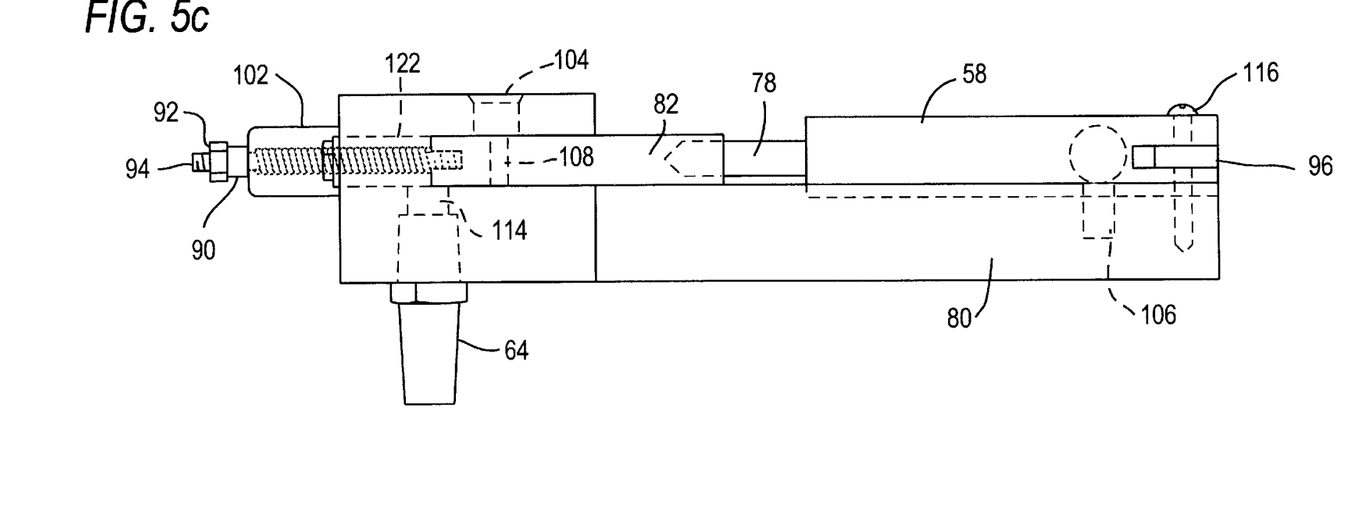

Referring to FIGS. 4a and 4b, the modifications to the spray gun include replacing an electrical microswitch 132 adjacent to the trigger 74 with a subminiature three-way poppet air valve 44. This modification has dramatic effects on the operation of the gun. The TRIBOMATIC® gun, and many other prior art guns, have the electrical switch 132 and electrical wiring 134 connected to a controller with electrically controlled valves (not shown) which release the airs into lines 52 and 54. The invention allows the removal of all electrical switches and wiring from the gun and controller module and replaces it with air line 70 from the modified controller and air line 46 which is charged after the subminiature air valve 44 is activated. It is the increase in pressure in line 46 which signals the controller to release air into lines 52 and 54 and, optionally, operates the metering device 76, as described below.

The metering device is comprised of a base 80 which may be made of plastic or any suitable material. A cylinder 58 in which a piston and rod 78 is slideably mounted is bracketed to the base by a cylinder bracket 96 held in place with screws 116. The rod 78 is affixed to a ported slide 82 which fits within a slide housing 98. Attached to slide housing 98 is a slide housing cover 100 and attached thereto is a threaded adapter 86 for a powder canister 84 (FIG. 4a). Also shown is a powder inlet port 104 through which powder will flow to the ported slide 82. At the end opposite the rod 78 the slide is fixedly attached to a rod 94 which is threaded at its end opposite the ported slide 82 and is kept in alignment by end bracket 102, locknut 92 and tubular spacer 90. The end bracket 102 is attached to the slide housing 98 with screws 118.

When compressed gas enters an air inlet port 106 it feeds into cylinder 58 and a pressure increase within the cylinder 58 forces rod 78 to slide outwardly from the cylinder. The ported slide 82, which is attached to the rod 78, is caused to slide through a slide opening 122 in the slide housing 98 in a direction toward end bracket 102 (indicated by arrow "A" on FIG. 6a). When the slide is at rest slide port 108 is in alignment with inlet port 104 so slide port 108 will start out being filled with powder which has entered it through gravity. Alternatively, it is possible to allow slide port 108 to align with powder inlet port 104 after the ported slide 82 begins to travel and it is further possible to assist the powder into the slide port with compressed air. Regardless, as the slide port 108 travels to a point where it is in alignment with a base port 114 in the base 80, the powder in the slide port feeds into the base port 114 in the base 80, into the connector 64, and into a low pressure region of the gun chamber 68 where it mixes with the compressed gas streams from lines 52 and 54. The powder is then electrically charged and expelled from the gun chamber through an opening at the end of the barrel (not shown).

When the trigger 74 is released, a vent 45 in the three-way poppet valve 44 releases the compressed gas from line 46 and spring 88 exerts a force upon the ported slide 82 so that it returns (in the direction indicated by arrow "B" on FIG. 6a) to a starting position. A spring included within the cylinder (not shown) assists with this process.

Because powder inlet port 104 is not in alignment with the base port 114 (See FIG. 5c) the amount of powder fed to the gun chamber is the amount of powder carried by the slide port 108. Therefore, the exact amount of powder delivered to the gun chamber can be adjusted by changing the volume of slide port 108. Further, the rate at which the powder is fed to the gun and the duration of the feeding can be controlled by the orientation and shape of the slide port. For example, a relatively long and narrow slide port, such as that shown in FIG. 6b, would result in a slow injection rate and a long injection duration. A short and wide slide port, such as that shown in FIG. 6c, would result in a fast injection rate and a shorter injection duration. It is also possible to have multiple slide ports. The injection rate may also be adjusted by changing the shape of inlet port 104 or base port 114 or by changing the pressure in line 46 which feeds the metering device, i.e. a lower pressure will result in a slower moving slide and, consequently, a longer injection duration. It is preferred that the slide port 108 be of such a shape or length so that it does not communicate simultaneously with inlet port 104 and base port 114 because if it did so powder could move freely from the powder container into the gun chamber. While there may be applications where this is desirable, doing so with this embodiment prevents an exact metering of the powder.

While the powder may drop from the slide port into the connector 64 and chamber 68 by gravity alone, in the most preferred embodiments the pressures in lines 52 and 54 may be adjusted in such a way that a slight vacuum is created in the gun chamber and this vacuum assists the movement of the powder into the chamber. Surprisingly, this vacuum also increases the efficiency of the metering device because it pulls excess loose powder away from the ported slide 82 so that it does not jamb in the slide housing 98.

Optionally, fine tuning of the metering apparatus may include additional vent openings in the base 80, slide housing 98 and/or housing cover 100 which lead to connector 64 so that powder buildup around slide 82 can be removed by the negative pressure caused by the flow air and jamming could be further reduced. Further, separate openings in housing cover 100 can open to the top of slide port 108 while it is aligned with base port 114 so that air is freely pulled into the top of slide port 108 as the powder exits.

Figure 1A:
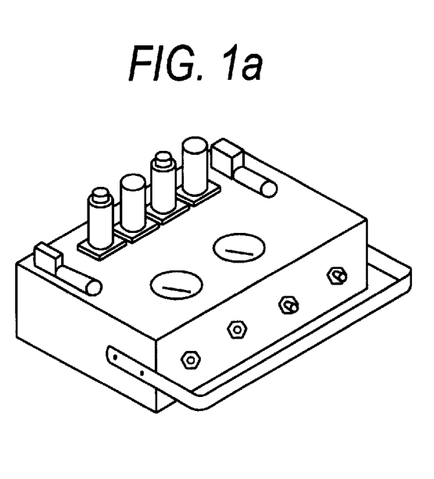
Figure 1B:
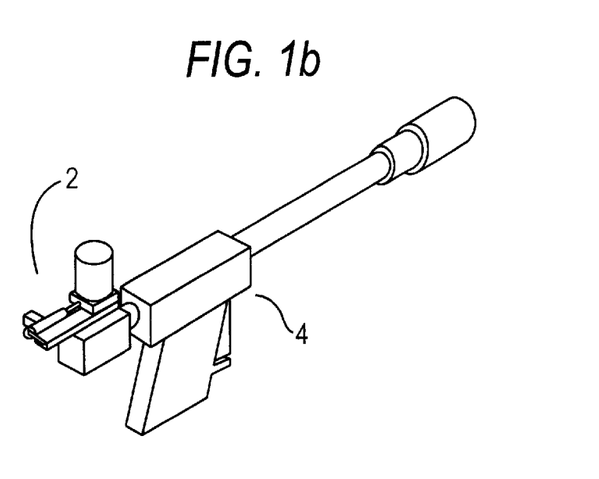
Figure 1C:
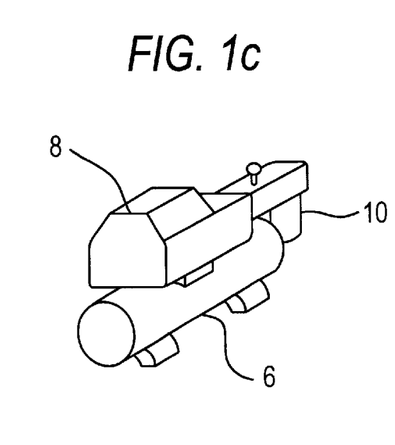
Figure 1D:
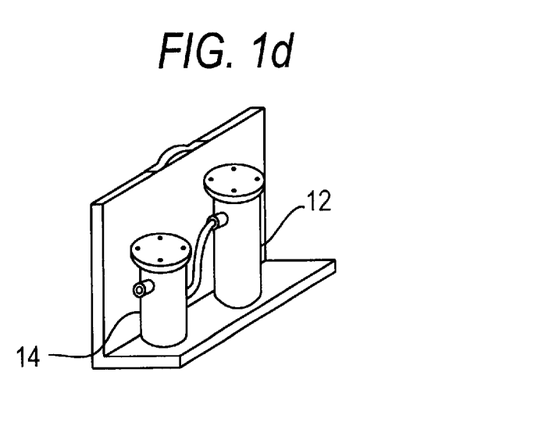
Figure 2:
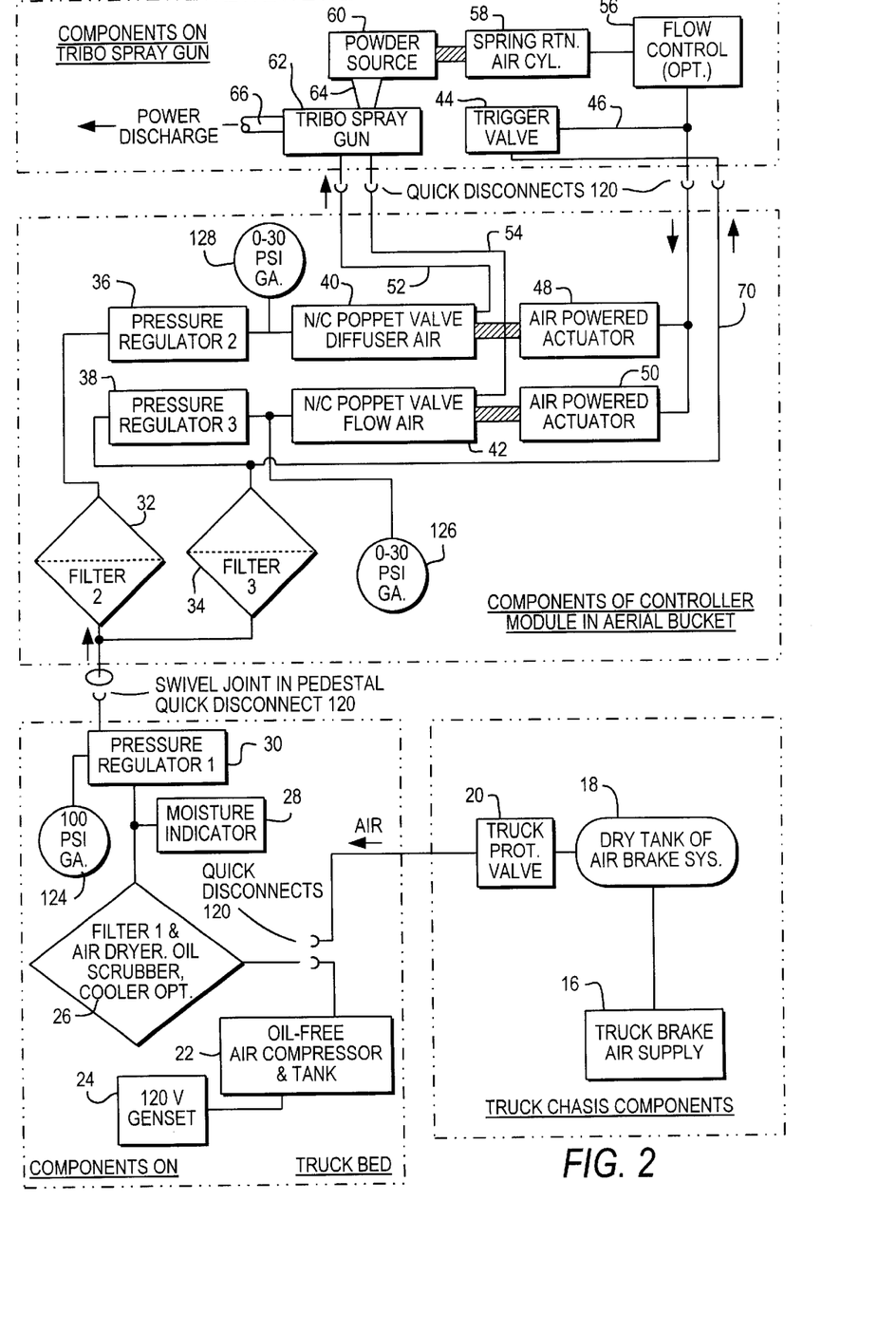

It should be noted that too much pressure in lines 52 and/or 54 may prevent the powder from entering the chamber because a positive pressure may be created in the chamber at the inlet point of connector 64. The pressure adjustments, while important, are well within the capacity of those familiar with triboelectric spraying devices. In practice, the pressure output of regulator 30 should be higher than the pressure from regulators 36 and 38. FIG. 2 shows the location of a 0–100 psi gauge 124 and two 0–30 psi gauges 126, 128 to aid the operator. Typically, the output of regulator 30 is at least 5 psi, and often 20–25 psi higher than that of regulators 36 and 38. Where the output of regulator 30 is higher than about 40 . 45 psi the optional flow controller 56 is recommended to reduce the pressure to the metering device 76 so that the ported slide 82 speed and the force generated by the slide movement is not excessive. The flow controller 56 can also help synchronize the metering device with the airs from lines 52 and 54. An output of 45 psi from regulator 30 and 15–20 psi from regulators 36 and 38 has worked well in the field, however, individual operators can easily adjust the pressure settings for maximum efficiency depending, among other things, on the type of material being sprayed.

The apparatus is further incorporated with quick release connectors 120 between the spray gun/metering apparatus and controller module; between the controller module and the air conditioning unit/moisture indicator/regulator 30; and between the air conditioning unit/moisture indicator/regulator 30 and the compressed air supply, as shown on FIG. 2. In practice, caps should cover all lines into and out of the air conditioning unit when it is not in use in order to preserve a desiccant cartridge therein and to prevent the entry of foreign matter.

Figure 7:
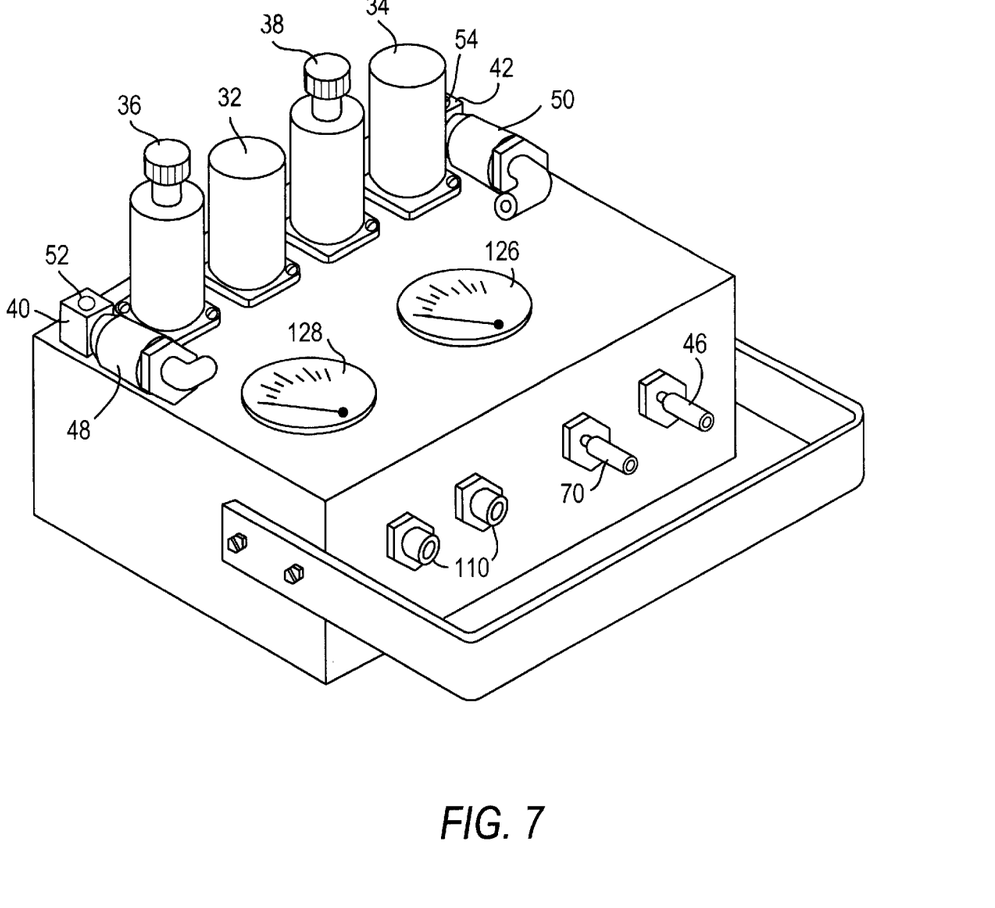

FIG. 7 is a detailed view of a preferred controller module which shows structure detailed above in FIG. 2 and, additionally, inlet connectors 110.

Parts used in the most preferred embodiments include:

| Air Conditioner | |
|---|---|
| Filter shell | Parker STAS-487T |
| Filter element | Alco F-48 |
| Dryer shell | Parker STAS-967T |
| Dryer element | D-48 |
| Moisture Indicator | Motorguard JAD-30 |

| Controller Module | |
|---|---|
| Filters | Clippard Instrument Labs R-801 |
| Regulators | Clippard Instrument Labs R-701 |
| Actuators | Clippard Instrument Labs MPA-7 |
| Normally closed poppet valves | Clippard Instrument Labs MJV-3 |

| Metering Apparatus | |
|---|---|
| Air cylinder | Clippard Instrument Labs 3CS |
| Trigger valve | Clippard Instrument Labs SMAV-3 |

The invention has numerous applications including spray painting, application of powdered lubricants and controlled or supplemental pollination and is particularly well suited for use in the field for applying pollen to plants. The spray gun and metering apparatus were successfully used to pollinate a portion of a Loblolly Pine seed orchard.

While the invention has been described with reference to preferred embodiments, it will be understood by those skilled in the art that various changes may be made and equivalents may be substituted for elements thereof without departing from the scope of the invention. For example, a wide variety of triboelectric and electrostatic spray guns could be modified in a way which is consistent with the this invention so that electrical wiring between the spray gun and the controller element will be eliminated. In addition, while the metering device is described above as being used with the air actuated gun it is possible to eliminate the metering device and yet still benefit from the air controlled gun/controller combination while other traditional means of delivering powder to the gun chamber are utilized. Alternatively, the metering device could be utilized on a variety of spray guns with standard electrical controls as long as it was connected to an air supply which an operator could activate. This air supply could be separate from the spray gun air supply so that, for example, the flow and diffuser airs could be continuous and short bursts of powder would be delivered by a separate user controlled activation of the metering device air supply.

Further, it should be understood that a wide variety of compressed air sources, including gas cylinders for remote operations, can be used with the invention and that optimization of air supply filtration, drying, oil scrubbing, cooling, pressure regulation and other variables is generally known and can be adjusted by those familiar with the art.

In addition, many modifications may be made to adapt a particular situation to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A gas-controlled apparatus for spraying electrically charged particulate matter, comprising:
   (a) a chamber having a surface suitable for electrically charging the particulate matter and an opening through which the particulate matter exits the chamber;
   (b) a trigger-activated valve which releases a first compressed gas into a first tubing causing a pressure increase in the first tubing;
   (c) a first pressure activated valve which releases a second compressed gas into the chamber in response to the pressure increase in the first tubing;
   (d) a second pressure activated valve which releases a third compressed gas into the chamber in response to the pressure increase in the first tubing;
   (e) a means for delivering the particulate matter to the chamber where it mixes with the second compressed gas and the third compressed gas and is expelled through the opening.

2. The gas-controlled spraying apparatus of claim 1, further comprising a source of compressed gas.

3. The gas-controlled spraying apparatus of claim 2, wherein the source of compressed gas further comprises a pressure regulation means.

4. The gas-controlled spraying apparatus of claim 2, wherein the source of compressed gas further comprises a filtering means.

5. The gas-controlled spraying apparatus of claim 1, further comprising a grounding wire connected at a first end to the chamber and at a second end to a grounding surface.

6. The gas-controlled spraying apparatus of claim 1, further comprising a pressure regulation means for regulating the pressure of the second compressed gas.

7. The gas-controlled spraying apparatus of claim 1, wherein the means for delivering the particulate matter is a metering apparatus.

8. The gas-controlled spraying apparatus of claim 7, wherein the first compressed gas flows to the metering apparatus.

9. The gas-controlled spraying apparatus of claim 8, wherein the first compressed gas flows through a flow controller before flowing to the metering apparatus.

10. The gas-controlled spraying apparatus of claim 8, wherein the metering apparatus delivers particulate matter to the chamber in response to the pressure increase in the first tubing.

11. The gas-controlled spraying apparatus of claim 1, wherein the means for delivering the particulate matter comprises:
   (a) a particulate tubing attached at a first end to the chamber and attached at a second end to a particulate source; and
   (b) a particulate movement means.

12. The gas-controlled spraying apparatus of claim 7, wherein the metering apparatus comprises:
   (a) a gas inlet port for receiving a compressed gas;
   (b) a cylinder with an interior space for receiving the compressed gas from the gas inlet port;
   (c) a piston with a first end and a second end which is slideably mounted to the cylinder at its first end;
   (d) a slide which is slideably mounted within a housing and which has a first end and a second end and which is attached at its first end to the piston second end;
   (e) a slide port within the slide;
   (f) a spring attached to the second end of the slide;
   (g) a powder canister mounted to the housing at a powder inlet port;
   (h) a connector with a bore therethrough which is located below the slide and which is offset from the powder inlet port;
   such that when the compressed gas enters the gas inlet port it travels into the cylinder interior space and causes a pressure increase which moves the piston and the slide attached thereto so that the slide port, which has previously received powder which traveled by at least gravity from the powder canister through the powder inlet port into the slide port, moves until the slide port aligns with the bore of the connector, wherein the powder is caused to enter the bore by at least gravity and, wherein the spring forces the slide back to a starting position.

13. The gas-controlled metering apparatus of claim 12, wherein the gas inlet port further comprises a flow controller.

14. The gas-controlled spraying apparatus of claim 7, wherein the metering apparatus comprises:
   (a) a gas inlet port for receiving a compressed gas;
   (b) a cylinder with an interior space for receiving the compressed gas from the gas inlet port;
   (c) a piston with a first end and a second end which is slideably mounted to the cylinder at its first end;
   (d) a slide which is slideably mounted within a housing and which has a first end and a second end and which is attached at its first end to the piston second end;
   (e) a slide port within the slide;
   (f) a spring attached to the second end of the slide;
   (g) a powder canister mounted to the housing at a powder inlet port;
   (h) a connector with a bore there through which is located below the slide and which is offset from the powder inlet port;
   such that when the compressed gas enters the gas inlet port it travels into the cylinder interior space and causes a pressure increase which moves the piston and the slide attached thereto until the slide port aligns with the powder inlet port, wherein powder travels from the powder container through the powder inlet port and enters the slide port by at least gravity, and the slide continues to move until the slide port aligns with the bore of the connector, wherein the powder is caused to enter the bore by at least gravity and, wherein the spring forces the slide back to a starting position.

15. The gas-controlled metering apparatus of claim 14, wherein the gas inlet port further comprises a flow controller.

16. The gas-controlled spraying apparatus of claim 1, further comprising a vent for dissipating the pressure increase in the first tubing.

17. The gas-controlled spraying apparatus of claim 1, further comprising a vent for releasing the first compressed gas from the first tubing such that the pressure increase is dissipated.

18. The gas-controlled spraying apparatus of claim 1, further comprising means for regulating the flow of the second compressed gas and the third compressed gas.

19. The gas-controlled spraying apparatus of claim 18, wherein the flow of the second compressed gas may be controlled independent of the flow of the third compressed gas.

20. A gas-controlled spraying apparatus comprising:
   (a) a trigger-activated valve which releases a first compressed gas into a first tubing causing a pressure increase in the first tubing;
   (b) a first pressure activated valve which releases a second compressed gas into a second tubing in response to the pressure increase in the first tubing;
   (c) a second pressure activated valve which releases a third compressed gas into a third tubing in response to the pressure increase in the first tubing;
   (d) a chamber into which the second and third compressed gases flow from the second and third tubing, the chamber having a surface suitable for electrically charging particulate matter;
   (e) a means for delivering a particulate matter to the chamber where it mixes with the second and third compressed gases to form a particulate stream; and
   (f) an opening in the chamber through which the particulate stream may exit after the particulate matter is electrically charged.

21. The gas-controlled spraying apparatus of claim 20, wherein the means for delivering a particulate matter comprises:
   (a) a particulate tubing attached at a first end to the second tubing and attached at a second end to a particulate source; and
   (b) a particulate movement means.

22. The gas-controlled spraying apparatus of claim 20, wherein the apparatus further comprises a first pressure regulator for regulating a pressure of the second compressed gas and a second pressure regulator for regulating a pressure of the third compressed gas.

23. The gas-controlled spraying apparatus of claim 20, further comprising a source of compressed gas.

24. The gas-controlled spraying apparatus of claim 20, wherein the source of compressed gas further comprises a pressure regulator.

25. The gas-controlled spraying apparatus of claim 20, wherein the source of compressed gas further comprises a filtering means.

26. The gas-controlled spraying apparatus of claim 20, wherein the apparatus further comprises a grounding wire connected at a first end to the chamber and at a second end to a grounding surface.

27. A gas-controlled spraying apparatus comprising:
   (a) means for releasing a first compressed gas into a first tubing such that a pressure increase results in the first tubing;
   (b) means for releasing a second compressed gas into a chamber in response to the pressure increase in the first tubing;
   (c) means for releasing a third compressed gas into the chamber in response to the pressure increase in the first tubing;
   (d) means for delivering a particulate material to the chamber such that the particulate material mixes with the second compressed gas and the third compressed gas to form a particulate stream;
   (e) means for electrically charging the particulate material in the particulate stream; and
   (f) means for allowing the particulate stream to escape from the chamber.

28. The gas-controlled spraying apparatus of claim 27, further comprising means for dissipating the pressure increase in the first tubing.

29. A gas-controlled spraying apparatus comprising:
   (a) means for releasing a first compressed gas into a first tubing such that a pressure increase results in the first tubing;
   (b) means for releasing a second compressed gas into a second tubing in response to the pressure increase in the first tubing;
   (c) means for releasing a third compressed gas into a third tubing in response to the pressure increase in the first tubing;
   (d) means for allowing the second and third compressed gases to flow from the second and third tubings into a chamber;
   (e) means for delivering a particulate material to the chamber such that the particulate matter mixes with the second and third compressed gases to form a particulate stream;
   (f) means for electrically charging the particulate matter in the particulate stream; and
   (g) means for allowing the particulate stream to escape from the chamber.

30. A method for spraying a particulate matter with gas, comprising the steps of:
   (a) discharging a first pressurized gas into a first tubing such that a pressure increase results in the first tubing;
   (b) discharging a second pressurized gas into a chamber in response to the pressure increase in the first tubing, the chamber having a surface suitable for electrically charging the particulate matter;
   (c) discharging a third pressurized gas into the chamber in response to the pressure increase in the first tubing;
   (d) discharging the particulate matter into the chamber to form a particulate stream; and
   (e) discharging the particulate stream from the chamber as the particulate matter is electrically charged.

31. The method for spraying of claim 30, further comprising the step of dissipating the pressure increase in the first tubing.

32. A gas-controlled spray gun comprising:
   (a) means for releasing a first compressed gas into a first tubing such that a pressure increase results in the first tubing, the first tubing including connecting means such that it can be connected to a controller module;
   (b) means for receiving a second compressed gas from a second tubing into a chamber, the second tubing including connecting means for connecting to the controller module;
   (c) means for receiving a third compressed gas from a second tubing into a chamber, the second tubing including connecting means for connecting to the controller module;
   (d) means for receiving a particulate material in the chamber such that the particulate material mixes with the second compressed gas and the third compressed gas to form a particulate stream;
   (e) means for electrically charging the particulate material in the particulate stream; and
   (f) means for allowing the particulate stream to escape from the chamber.

33. A gas-controlled controller module comprising:
   (a) means for connecting to a spray gun;
   (b) means for releasing a compressed gas into a tubing in response to a signal from a spray gun, the signal being in the form of a pressure increase;
   (c) means for connecting the tubing to a spray gun so that the compressed gas can flow to the spray gun.

34. A gas-controlled controller module comprising: a pressure activated valve connected to a first tubing for releasing a compressed gas into a second tubing in response to a pressure increase in the first tubing, the controller module being suitable for use with a spray gun.

* * * * *